United States Patent Office 3,462,477
Patented Aug. 19, 1969

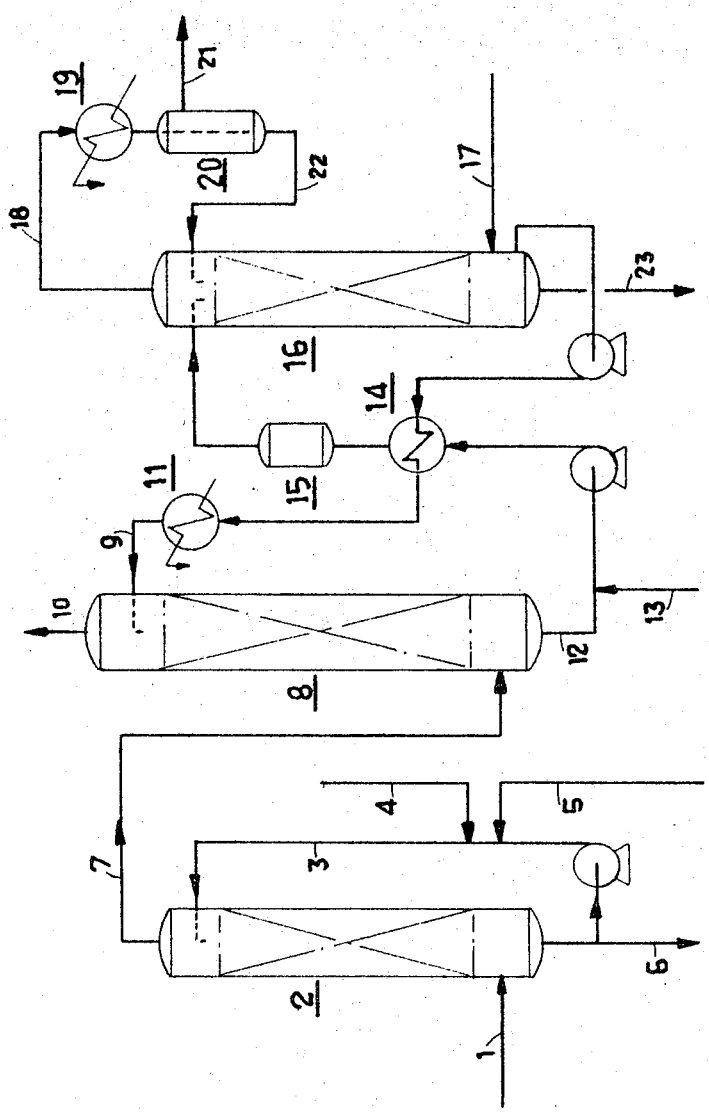

3,462,477
PROCESS FOR THE PURIFICATION OF
ACRYLONITRILE
Giorgio Caporali, Giuseppe Barberis, Natale Ferlazzo, and Vittorio Penzo, Milan, Italy, assignors to Montecatini-Edison, S.p.A., Milan, Italy
Filed Apr. 27, 1966, Ser. No. 545,618
Claims priority application Italy, May 4, 1965, 10,029/65
Int. Cl. C07c *121/32, 121/02*
U.S. Cl. 260—465.3                    5 Claims

ABSTRACT OF THE DISCLOSURE

Crude acrylonitrile fractions resulting from the vapor phase catalytic reaction of propylene, oxygen and ammonia and contaminated with acrolein and unreacted ammonia are purified by washing the reaction gases to rid the same of unreacted ammonia. The washed gases are then dissolved in water and the pH of the solution is adjusted to a value between about 7.5 and 11 and said adjusted aqueous solution is heated to a temperature from between about 70° C. and 150° C. for from 1 to 60 minutes and an acrylonitrile fraction substantially free of acrolein is thence recovered therefrom.

---

The present invention relates to a process for the purification of acrylonitrile, and, more particularly, it relates to a process for the removal of acrolein from crude acrylonitrile via a heat treatment thereof in an aqueous medium.

Acrylonitrile produced by catalytic reaction of propylene, ammonia and oxygen in gaseous phase is known to be accompanied by the by-production of various impurities, the amount of which impurities being directly proportional to reaction conditions and particular catalysts employed.

Among these impurities there may be mentioned, in decreasing order of quantities present, hydrocyanic acid, acetonitrile, acrolein, acetone, acetaldehyde, and other minor by-products in lesser amounts.

For the purification of acrylonitrile, and particularly the removal of acrolein therefrom, many and varied processes are known in the art, which processes all have for their object purification of acrylonitrile to a degree suitable for polymerization, and, in particular, for the production of fibers.

It is known to remove acrolein from acrylonitrile via distillation in the optional presence of water, or after having converted the acrolein, a volatile product, into its cyanohydrin, which is a product of low volatility.

However, in order to obtain an acrylonitrile fraction by simple distillation having an acrolein content of less than 5 parts per million, as is required by specifications generally adopted for "fiber grade" acrylonitrile, one must employ cumbersome and expensive operating methods. On the other hand, even when working with the cyanohydrin of acrolein, other difficulties are encountered because, under certain specific operating conditions, this product partially decomposes and thereby reverts to acrolein, per se.

Furthermore, while attempting to separate acrolein from acrylonitrile by distillation, there is a very strong tendency towards polymerization of both acrolein and its cyanohydrin, and thus there arises the serious drawbacks of formation of polymers in the various subsequent distillation columns.

It is also known that acrolein present in trace amounts in acrylonitrile can be eliminated therefrom by spontaneous homopolymerization, without further intervention on the part of the operator. However, the acrylonitrile produced from propylene, $NH_3$ and $O_2$ industrially always contains considerable amounts of acrolein, and thus spontaneous homopolymerization can be ruled out, for all intents and purposes, for the purification of acrylonitrile.

Thus, it is the primary object of this invention to provide a process for the removal of acrolein from acrylonitrile that is free of the disadvantages attendant known art processes.

A further object of this invention is that of providing a process for the removal of acrolein from acrylonitrile capable of yielding acrylonitrile of high purity, and even when starting with a crude acrylonitrile fraction having a high percentage of acrolein.

Another object is that of providing a process for the purification of acrylonitrile which is effective, simple and inexpensive.

Still another object of this invention is that of providing a process for the removal of acrolein from acrylonitrile which permits of the elimination of acrolein without concomitant waste of acrylonitrile during purification.

These and other objects are attained according to the process of the present invention, which further offers the advantages of requiring only extremely simple equipment for the execution thereof, while the normal operating conditions are such as to lend themselves to working either at atmospheric or superatmospheric pressure for the elimination of all impurities from acrylonitrile without the burdens of additional equipment or without the need for particular technical effects or technological devices.

Another advantage of the process of this invention, which reflects favorably on the economics thereof, as well as the yields of final product, is that the removal of the acrolein from the acrylonitrile takes place without attendant side reactions arising which cause losses of acrylonitrile or acetonitrile, such as is the case with known techniques.

Still another advantage of the process according to this invention is that during the purification phase or removal of the acrolein from the acrylonitrile, no solid or liquid water immiscible reaction products are formed in the aqueous medium thereof.

According to this invention, briefly, crude acrylonitrile obtained by catalytic reaction of propylene, ammonia and $O_2$ in gaseous phase is rid of its acrolein content by dissolving said crude acrylonitrile in water, after having removed unreacted $NH_3$ therefrom so as to obtain an aqueous solution of crude acrylonitrile having a pH range of from between 7.5 and 11, said pH having been adjusted by addition of alkalizers to the water or directly to the solution, in the event that dissolution is initially in non-alkaline water; and thence by heating and maintaining the solution at a temperature of from between 70° C. and 150° C. for a period of from between 1 and 60 minutes, subjecting said solution to distillation and then separating the crude acrylonitrile, which is now substantially free of arolein.

According to one embodiment of the process of this invention, removal of the acrolein from the crude acrylonitrile which was obtained by catalytic reaction of propylene, $NH_3$ and $O_2$ in gaseous phase, was carried out in the following manner: the gaseous mixture, directly obtained from the catalytic reaction between propylene, $NH_3$ and $O_2$, and consisting of acrylonitrile, hydrocyanic acid, acetonitrile, acrolein, aceton, acetaldehyde, lesser amounts of other impurities, and, furthermore, the excess of unconverted reactants, ammonia included, was washed continuously to remove the unconverted ammonia, according to known methods, such as, for example, in a packed washing tower with dilute sulfuric acid and maintained at a temperature slightly above the condensation point of the organic products, so as was avoided any condensation, thus rendering product dissolution negligible.

The gaseous mixture thus freed of ammonia and, optionally, cooled, was then countercurrently continuously conveyed to a plate tower, or other such tower together with $H_2O$ having a pH of from between 7.5 and 11, which pH was effected via addition of alkalizers thereto, e.g., the hydroxides or alkaline carbonates, and at approximately atmospheric pressure and approximately room temperature. The aqueous solution thus obtained was then heated at a temperature of from between 70° C. and 150° C. and directed to a suitable container where it was maintained at such temperatures for a period of from 1 to 60 minutes. After this time interval, there remained in the solution only traces of acrolein and the solution was thence distilled, which latter step was carried out according to know methods, for example, by continuously feeding the solution to the top of a tower, at the bottom of which there was injected steam; the dissolved organic products were thus freed in vapor stage together with the water vapor, and they were then condensed and conveyed to subsequent operations for the removal of residual impurities from the acrylonitrile.

The water-saturated crude acrylonitrile thus collected contained only trace amounts of acrolein, which during subsequent operations were themselves spontaneously reduced to quantities below 5 p.p.m., according to conventional art methods.

The pH range of the solution containing the products from the gaseous mixture is mainly dependent upon the temperature and the duration of the subsequent heating phase, and the pH range according to this invention is comprised from between 7.5 and 11; however, values lower than about 8.5 proved to be substantially ineffective while values above about 10, though effective, are not preferred. The preferred range is from between about 8.5 and 10.

The temperatures for heating the aqueous solution containing the dissolved reaction products varies from between 70° C. and 150° C., and preferably ranges from between 75° C. and 90° C.

The duration of heating of the aqueous solution of the crude acrylonitrile is from between 1 and 60 minutes, and preferably from between 5 and 30 minutes.

The water for dissolving the gaseous reaction products may either be initially alkaline or it may be non-alkaline, and in the latter case the solution thus obtained therefrom is then rendered alkaline via addition to the solution of suitable alkalizers, such as the hydroxides or alkaline earth metal carbonates, preferably in aqueous solution. The alkaline earth metal bicarbonates may also be used, since there are converted to their corresponding carbonates during heating, particularly during heating up to their boiling points.

The amount of alkalizers to be added is dependent upon their nature and upon the particular pH required.

The pressure at which the dissolution is effected is not critical, and it may be convenient to operate at atmospheric pressure, as well as at slightly superatmospheric pressures, depending upon the pressure of the reaction environment of the acrylonitrile purification for the process according to the present invention. Also, dissolution temperatures are not critical, but, since acrylonitrile is a rather volatile product, a temperature near room temperature is preferred.

To further illustrate the present invention and the advantages thereof, the following specific examples are given, it being understood that these are merely intended to be illustrative and not limitative.

More specifically, Example 6 was carried out in order to better illustrate the importance of the pH factor in the process according to the present invention, and in which example there are described tests carried out with different pH values on samples taken from the same starting solution, under constant temperature and constant heating duration.

EXAMPLE 1

The products from the catalytic reaction of propylene, ammonia and air in gaseous phase, and comprising acrylonitrile, acetonitrile, hydrocyanic acid, acrolein, acetaldehyde, acetone, water, carbon dioxide, carbon monoxide and minor amounts of other byproducts, and, furthermore, unreacted oxygen, nitrogen, propylene and ammonia, and after having transferred part of their heat for generating vapor and after having been cooled to a temperature of around 200° C., were conveyed through pipe 1 (FIG. 1) to the bottom of washing tower 2 in which the ammonia was selectively eliminated. For this purpose, an aqueous solution containing from 1–2% sulfuric acid and 30–40% ammonium sulfate entered through pipe 3 and was made to circulate in Tower 2 at a temperature maintained at between 85° to 90° C.

The sulfuric acid consumed in the neutralization of ammonia was replenished by introducing concentrated sulfuric acid through pipe 5, while through pipe 4 there was introduced water for integrating losses due to saturation of the gas and to the discharge of ammonium sulfate in form of a solution, as is described hereunder.

Through pipe 6 there was continuously or intermittently extracted an amount of the solution such as would discharge the ammonium sulfate as it was formed, albeit its concentration within the cycle remained constant and corresponding in degree to that hereinbefore mentioned.

The gaseous products of the reaction (less the ammonia), which had a temperature of between 85–90° C., and which were saturated with water vapor, left column 2 and were conveyed through pipe 7 to the bottom of absorption tower 8 wherein they were washed with water in countercurrent which water absorbed and dissolved the organic products, the hydrocyanic acid and part of the carbon dioxide, while the gaseous compounds (nitrogen, oxygen, carbon monoxide the remaining carbon dioxide and propylene) were discharged through pipe 10.

The washing water was supplied through pipe 9 at a temperature of between 20° and 35° C. and came from stripping tower 16, as is hereinafter further elucidated. This water had a pH equal to 10 and contained dissolved therein about 0.2 g./l. of Na in the form of its carbonate and bicarbonate.

At the bottom of column 8 there was gathered a dilute aqueous solution of the reaction products, which had a pH about 7–7.5 and the following composition:

|  | Percent |
|---|---|
| Acrylonitrile | 1.32 |
| Acetonitrile | 0.11 |
| Hydrocyanic acid | 0.10 |
| Acrolein | 0.2 | and contained minor quantities or traces of other byproducts.

The solution thus obtained left tower 8 through pipe 12 and at 13 there was continuously added thereto an aqueous solution of NaOH in such an amount as to increase its pH to 8.5.

The alkalized solution was then heated to 85° C. in 14 via heat exchange with a boiling solution coming from 16 and flows through vessel 15 for a contact time of 15 minutes. This solution of reduced acrolein content according to the present invention entered the top of tower 16. At the bottom of this tower there was adducted through 17 a quantity of live vapor sufficient to eliminate from the solution all volatile organic products dissolved therein.

These volatile organic products were vaporized together with water vapor trough 18 and were conveyed to 19 wherein they were condensed; the condensation was then separated into two phases in 20, in upper organic phase, and a lower aqueous phase.

The aqueous phase was re-cycled to tower 16 through 22, while the organic phase, which is saturated with water, constituted the purified product according to this invention.

This latter phase had the approximate following composition:

| | Percent |
|---|---|
| Acrylonitrile | 84.0 |
| Acetonitrile | 7.0 |
| Hydrocyanic acid | 4.8 |
| Acrolein | 0.02 |
| Acetone | 0.17 |
| Water | 4.0 | disregarding the traces impurities.

With respect to acrylonitrile, the percentage of acrolein had dropped from 1.5% to 0.24%, i.e., had been reduced to about 1/60 of its initial value.

Such low contents of acrolein present no further problems for their definitive elimination, which elimination takes place spontaneously in the subsequent phases of final purification of the acrylonitrile.

The boiling alkaline solution, freed of all volatile organic compounds, collected at the bottom of tower 16, and was drawn off through pipe 9 and re-cycled to the absorption phase after having been cooled in 14 and in 11. A portion of the solution, however, was discharged through pipe 23 in an amount corresponding to the amount of water vapor introduced into the system via towers 8 and 16.

EXAMPLES 2–5

With equipment substantially the same as that illustrated in FIG. 1 and using the same procedure as followed in Example 1, a number of tests were carried out in which there were varied three factors: pH, temperature and heating time.

More particularly, an aqueous solution of reaction products, containing approximately the following components:

| | Percent |
|---|---|
| Acrylonitrile | 1.27 |
| Acetonitrile | 0.09 |
| Acrolein | 0.028 |
| Hydrocyanic acid | 0.10 |
| Acetaldehyde | 0.012 |
| Acetone | 0.001 | was submitted as such, or after having been rendered alkaline to various pH values, to the heating phase at various temperatures, for different times, and was ultimately subjected to distillation to recover the organic products dissolved therein.

The distillate was then analyzed to establish the content of acrolein. Likewise, the aqueous solution subsequent to the heating phase was analyzed. Conditions and results are recorded in the following table:

TABLE I

| Examples | 2 | 3 | 4 | 5 |
|---|---|---|---|---|
| pH of the solution after addition of NaOH | 7.9 | 8.1 | 8.5 | 9.1 |
| Heating phase, time in minutes | 8 | 8 | 20 | 19 |
| Temperature in ° C | 50 | 90 | 90 | 90 |
| Composition of solution after heating phase: | | | | |
| Acrylonitrile, percent | 1.2 | 1.2 | 1.2 | 1.2 |
| Acetonitrile, percent | 0.09 | 0.09 | 0.09 | 0.09 |
| Acroline, percent | 0.022 | 0.006 | 0.002 | Traces |
| Hydrocyanic acid, percent | N.D | N.D | N.D | N.D |
| Acetaldehyde, percent | 0.012 | 0.012 | 0.012 | 0.012 |
| Acetone, percent | 0.001 | 0.001 | 0.001 | 0.001 |
| Composition of the distillate obtained: | | | | |
| Acroline, percent | 1.50 | 0.45 | 0.13 | 0.045 |
| Hydrocyanic acid, percent | 4.2 | 3.7 | 3.0 | 1.6 |
| Acetaldehyde, percent | 0.28 | 0.17 | 0.28 | 0.23 |
| Acetone, percent | 0.04 | 0.038 | 0.039 | 0.041 |
| Acrylonitrile, acetonitrile | As much as needed to reach a total=100 | | | |

EXAMPLE 6

A dilute aqueous solution obtained by absorbing in $H_2O$ the products of the catalytic reaction of propylene, ammonia and oxygen in gaseous phase to effect acrylonitrile, and having the following composition:

| | Percent |
|---|---|
| Acrylonitrile | 1.8 |
| Acetonitrile | 0.13 |
| Acrolein | 0.03 |
| Hydrocyanic acid | 0.07 |
| other substances in minor quantities | |

Was divided into four portions: one was left as is (pH=6) and to the other three were added variable quantities of sodium hydroxide, so as to obtain three samples respectively having a pH of 7.5, 7.8 and 8.5. Said samples were heated at 70° C. for 60 minutes. At intervals samples were drawn and analyzed to establish the disappearance curve of the acrolein from the solution with respect to time.

In the following table there is recorded all data of the tests carried out.

TABLE 2

| Drawing times in minutes | Solution with a pH=6 acrolein | | Solution with a pH=7.5 acrolein | | Solution with a pH=7.8 acrolein | | Solution with a pH=8.5 acrolein | |
|---|---|---|---|---|---|---|---|---|
| | Percent | p.p.m. | Percent | p.p.m. | Percent | p.p.m. | Percent | p.p.m. |
| 0 | 100 | 300 | 100 | 300 | 100 | 300 | 100 | 300 |
| 15 | 86 | 258 | 74 | 222 | 69 | 207 | 53 | 159 |
| 30 | 75 | 225 | 50 | 150 | 42 | 126 | tr. | tr. |
| 60 | 67 | 200 | 26 | 78 | 12 | 36 | tr. | tr. |

As can be seen from the above table, if one does not carry out the reactions in the pH range according to the present invention, the acrolein in the aqueous solution will not be reduced to concentrations useful for the purposes of the process according to this invention, even at industrially unacceptable heating times.

What is claimed is:

1. In a process for the purification of crude acrylonitrile fractions resulting from the vapor phase catalytic reaction of propylene, oxygen and ammonia and containing, in addition to said acrylonitrile, contaminating amounts of acrolein and unreacted ammonia, and after first having removed unreacted ammonia from the reaction gases to produce a crude gaseous fraction which is free of unreacted ammonia, the improvement comprising next dissolving said ammonia-free crude gaseous fraction in water; adjusting the pH of the aqueous solution to a value between about 7.5 and 11 by means of the addition of alkali; heating said aqueous solution having a pH of from between about 7.5 and 11 to a temperature of from between about 70° C. and 150° C. and maintaining such temperature for a period of from about 1 to 60 minutes; and thence recovering from such aqueous solution an acrylonitrile fraction substantially free of acrolein.

2. The process as defined by claim 1, wherein the acrylonitrile fraction substantially free of acrolein is recovered by distilling such heated aqueous solution.

3. The process as defined by claim 2, wherein the pH is adjusted to a value between about 8.5 and 10, the heating is to a temperature of from between about 750° C. and 90° C. and is maintained thereat for a period from about 5 to 30 minutes.

4. The process as defined by claim 3, wherein the unreacted ammonia is removed from the reaction gases by washing the same with dilute sulfuric acid.

5. The process as defined by claim 4, wherein the alkali is a member selected from the group consisting of alkaline earth metal carbonate, alkaline earth metal bicarbonate and alkali metal hydroxide.

References Cited
UNITED STATES PATENTS

| 3,185,636 | 5/1965 | Stevens et al. | 260—465.9 |
| 3,262,963 | 7/1966 | Modiano et al. | 260—465.9 |
| 3,328,266 | 6/1967 | Modiano et al. | 260—465.9 |

JOSEPH P. BRUST, Primary Examiner

U.S. Cl. X.R.

203—37, 39; 260—465.6, 465.9, 604